United States Patent [19]

Terada et al.

[11] Patent Number: 5,434,415
[45] Date of Patent: Jul. 18, 1995

[54] RADIATION-DETECTING LIGHT-TRANSMISSION APPARATUS

[75] Inventors: Hideo Terada, Sendai; Kazuo Sakuma, Miyagi; Masahiro Takebe, Sendai; Yoshihiro Atsumi, Tokyo; Katsumi Urayama; Michio Wakahara, both of Omiya, all of Japan

[73] Assignee: Mitsubishi Jukogyo Kabushiki Kaisha, Tokyo, Japan

[21] Appl. No.: 174,701

[22] Filed: Dec. 28, 1993

[30] Foreign Application Priority Data

Dec. 28, 1992 [JP] Japan ................... 4-349553

[51] Int. Cl.⁶ ................... G01T 1/20; G01T 1/203
[52] U.S. Cl. ................... 250/368; 250/367; 250/486.1
[58] Field of Search ............ 250/367, 368, 370.11, 250/390.11, 486.11

[56] References Cited

U.S. PATENT DOCUMENTS

| | | |
|---|---|---|
| 3,344,276 | 9/1967 | Balding . |
| 4,788,436 | 11/1988 | Koechner ............ 250/368 X |
| 4,812,013 | 3/1989 | Aurouet et al. ......... 250/368 X |
| 4,829,185 | 5/1989 | Cerff ................ 250/316 R |
| 4,931,646 | 6/1990 | Koechner ............ 250/367 |
| 5,103,099 | 4/1992 | Bourdinaud et al. ...... 250/368 |
| 5,281,820 | 1/1994 | Groh et al. ........... 250/368 |

FOREIGN PATENT DOCUMENTS

| | | | |
|---|---|---|---|
| 61-68580 | 4/1986 | Japan | ............ 250/368 |
| 3-242590 | 10/1991 | Japan | ............ 250/370.11 |
| 124555 | 1/1959 | U.S.S.R. | ............ 250/390.11 |
| 1349525 | 5/1988 | U.S.S.R. | ............ 250/367 |

OTHER PUBLICATIONS

Binon et al, "Modular Hadron Calorimeter", Nuclear Inst. & Meth. in Physics Research, A256, No. 3, 1987, pp. 444–448.

Kryshkin et al, "An Optical Fiber Readout for Scintillator Calorimeters", Nuclear Inst. & Meth. in Physics Research, A247, No. 3, 1986, pp. 583–585.

Eckhardt et al., "A Novel Light-Collection System for Segmented Scintillation-Counter Calorimeters", Nuclear Inst. & Meth., 155, No. 3, 1978, pp. 389–398.

*Primary Examiner*—Constantine Hannaher
*Assistant Examiner*—Edward J. Glick
*Attorney, Agent, or Firm*—Arnold, White & Durkee

[57] ABSTRACT

A radiation induced light wavelength shifter and an apparatus for detecting radiation and transmitting detected signal through an optical fiber are disclosed. A radiation induced light wavelength shifter used in such apparatus comprises a cylindrical scintillator, a fluorescent optical fiber an end of which is inserted into the scintillator, the fluorescent optical fiber extending out of the scintillator, a light shielding member covering the scintillator and the fluorescent optical fiber, and a light reflecting material covering the scintillator.

5 Claims, 11 Drawing Sheets

| TYPE | F200 | F201 | F202 | F203 | F204 |
|---|---|---|---|---|---|
| REFRACTIVE INDEX | CORE : 1.59 | | CLAD : 1.42 | | |
| EXCITED WAVELENGTH (nm) | 320 ~ 395 | 400 ~ 460 | 515 ~ 590 | 440 ~ 490 | 515 ~ 540 |
| EMITTED WAVELENGTH (nm) | 425 ~ 475 | 495 ~ 550 | 630 ~ 680 | 525 ~ 590 | 575 ~ 640 |
| EMISSION COLOR | BLUE | GREEN | RED | YELLOWISH GREEN | ORANGE |

RADIATION-DETECTING LIGHT-TRANSMISSION APPARATUS

BACKGROUND OF THE INVENTION

1. Field of the Invention

The present invention relates to a radiation-detecting light-transmission apparatus for use in nuclear power plants, radiological facilities, and the like which deal with radiation and radioactive substances.

2. Description of the Related Art

Scintillation detectors, semiconductor detectors, and the like have been used for detection of radiation and measurement of radiation in nuclear power plants, radiological facilities, non-destructive inspection technology, particle accelerating facilities, cyclotron radiation facilities, and so forth in which radioactive substances have to be handled. It should be noted that the term "radiation" used herein means alpha rays, beta rays, gamma rays, neutron rays, and X rays, individually or collectively.

In such scintillation detectors, a detecting section is composed of a scintillator and a photomultiplier tube assembled together, while in the semiconductor detectors, the detecting section is composed of a semiconductor sensor, high voltage power circuits, and signal circuits combined with one another. Detection signals are sent to a counting section through the signal circuit. The detection signals are analyzed by a single channel analyzer with count rates. Alternatively, they undergo spectral analysis treatment by a multi-channel wave height analyzer.

When a detecting and counting section are desired to be separated from each other in the conventional detectors before mentioned, a power cable and an electric signal cable are used therebetween. In place of the electric signal cable, it has been recently proposed that electric signals are converted into light signals at the detecting section and thereafter the light signals are transmitted through an optical fiber cable. In either of such systems, the detecting section has a power supply, and hence some countermeasures against noise problems are needed. In an improvement for alleviating noise problems, it has been attempted that a scintillator and a photomultiplier tube, which are usually placed adjacent to each other, are spaced apart from each other and connected by a bundle of optical fibers or an optical pipe, and that a power supply is removed from the detecting section, and the light from the scintillator is transmitted directly to the photomultiplier tube without conversion. However, such an attempt has not been successfully employed in commercial applications.

Also, in Japanese Patent Application No. 1-336296 filed by the same applicants on Dec. 27, 1989 (Japanese Laid-Open Patent Publication No. 3-242590), a microlens is employed to connect an end of one or more fluorescent optical fibers of a radiation induced light wavelength shifter with one optical fiber. In such structure, the wavelengths of the light emitted by the scintillator are shifted by the fluorescent optical fiber, and the output light of the fluorescent optical fiber is optically transmitted for a long distance to the counting section which is spaced apart therefrom.

As described above, conventional devices or apparatuses such as the detecting section of the scintillation detector and the semiconductor detector need power supplies in their detecting section and signals are converted electronically therein. Thus, under adverse environmental conditions, such as high temperature atmosphere or strong magnetic fields, it happen that the photomultiplier tube and the semiconductor do not work properly and measuring operation is adversely affected.

To overcome such a problem, a design in which the detecting section and the counting section are sufficiently spaced apart from each other with a long cable may be implemented. Such design, however, includes a long signal line exposed to a surrounding electromagnetic field and/or induction noise, thereby requiring another countermeasure.

Incidentally, when the conventional apparatuses are used in water, they require a waterproof structure and careful handling since the detecting sections have high voltage power supplies. Accordingly, a detector which does not require such a waterproof structure, a long electric cable, or a power supply in the detecting portion has been needed for long time.

Figure 14:
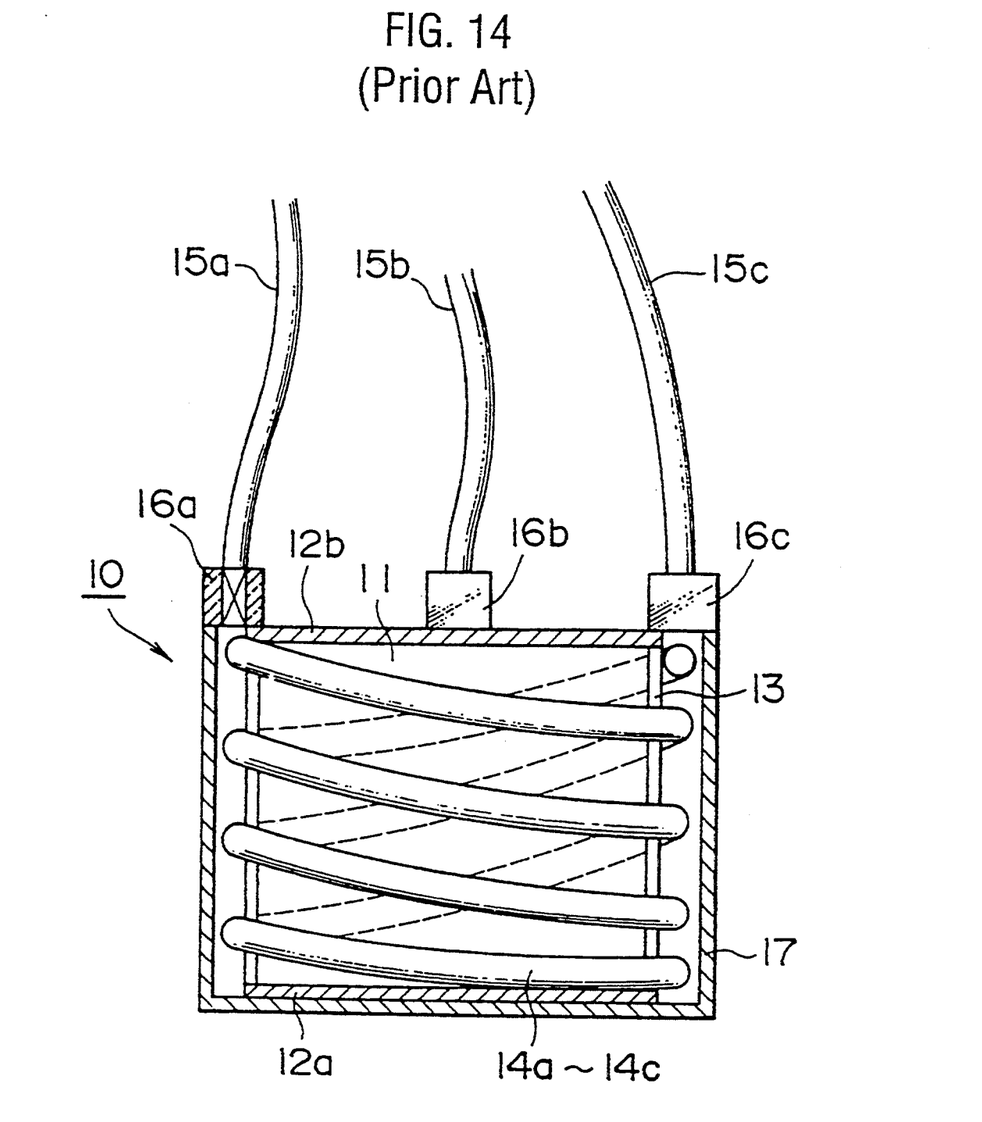
FIG. 14 is a schematic diagram showing the construction of an example of a conventional radiation induced light wavelength shifter.

In the invention in the above-mentioned patent application which invention was proposed so as to solve such problems, a radiation induced light wavelength shifter 10, as shown in FIG. 14, comprises a cylindrical or columnar scintillator 11, reflecting sheets 12a and 12b, and a transparent layer 13. When radiation enters the scintillator 11, it emits light. The optical reflecting sheets 12a and 12b are disposed on the upper and lower surface of the scintillator 11, respectively. The transparent layer 13 is disposed on the outer periphery of the scintillator 11.

Fluorescent optical fibers 14a–14c are wound around and on the outer periphery of the transparent layer 13 disposed on the scintillator 11. The fluorescent optical fibers 14a–14c are housed together with the scintillator, in a reflecting casing 17. The fluorescent optical fibers 14a–14c are, at one end, optically connected to optical transmission fibers 15a–15c through microlenses 16a–16c, respectively.

The object of winding the fluorescent optical fibers 14a–14c around the outer periphery of the scintillator 11 is to increase the incidence area for light, namely, the amount of incident light into the optical fibers, because the amount of light entering the fluorescent optical fibers 14a–14c is proportional to the incidence area through which the light passes.

Another problem has been found. Winding of the fluorescent optical fibers 14a–14c around the cylindrical scintillator 11 tends to adversely affect the refractive index of the fluorescent optical fibers 14a–14c. In addition, a relatively larger amount of light leaks out of the bent fluorescent optical fibers 14a–14c themselves and at the connection portions to the microlenses 16a–16c. Besides, the focus of the microlenses 16a–16c is inclined to deviate from the respective optical axes of the optical transmission fibers 15a–15c. Consequently, transmission loss is relatively large. Moreover, since light emitted by the scintillator 11 only enters the inner half side of the fluorescent optical fibers 14a–14c which are wound around the scintillator 11, the fluorescent optical fibers 14a–14c cannot efficiently shift the wavelengths of all the light, emitted by the scintillator 11, thereby providing an insufficient amount of light shifted in wavelength.

Moreover, winding the fluorescent optical fibers 14a–14c around the scintillator 11 with large contact length needs increases the size of the scintillator 11. Furthermore, when the microlenses 16a–16c are used, it is rather impossible to individually place the focus of the microlenses 16a–16c in complete alignment with the optical axes of the optical transmission fibers 15a–15c. In this case, it is also very difficult to connect or disconnect the optical transmission fibers 15a–15c as transmission paths to or from the radiation induced light wavelength shifter 10.

SUMMARY OF THE INVENTION

The object of the present invention which has been made in view of the above-mentioned state of art is to provide a compact and light-weight radiation-detecting apparatus which is capable of shifting wavelengths and performing optical transmission free of influence from electromagnetic fields, induction noise, and the like with efficiency and without a dedicated power supply.

The present invention provides a radiation induced light wavelength shifter comprising: a columnar scintillator; a fluorescent optical fiber which is axially inserted into the scintillator, said fluorescent optical fiber extending out of the scintillator; and a light shielding member covering said scintillator and said fluorescent optical fiber.

Since the fluorescent optical fiber is disposed along the axial center of the cylindrical scintillator, the light emitted by the scintillator can be received from all peripheral directions of the fluorescent optical fiber.

The present invention also provides a radiation-detecting light-transmission apparatus comprising: a columnar scintillator; a fluorescent optical fiber which is axially inserted into the scintillator, said fluorescent optical fiber extending out of the scintillator; a light shielding member covering said scintillator and said fluorescent optical fiber; a light reflecting material surrounding said scintillator arranged in said light reflecting member; and an optical transmission fiber which is connected to the other end of said fluorescent optical fiber through an optical connector, said optical transmission fiber transmitting light generated in said fluorescent optical fiber.

The light reflected by the light-reflecting material surrounding the cylindrical scintillator is collected toward the axial center, the fluorescent optical fiber can efficiently receive the light emitted by the scintillator. Thus, the shifting of wavelengths of the light and the transmission of optical signals can be realized with efficiency. The sensitivity of the counting section at a later stage can be improved.

The present invention further provides a radiation-detecting light-transmission apparatus comprising: a plurality of the radiation induced light wavelength shifters, each radiation induced light wavelength shifter comprising a columnar scintillator, a transparent optical member surrounding said cylindrical scintillator, a fluorescent optical fiber which is inserted substantially co-axially into said scintillator and emits light upon receiving light from the scintillator, an optical connector connected to the other end of the fluorescent optical fiber, a light reflecting material covering an outer circumferential and end surfaces of said transparent optical member, and a light shielding casing covering said scintillator and said fluorescent optical fiber; a collimator having a plurality of substantially parallel through holes for holding said radiation induced light wavelength shifters; a light shielding casing covering said plurality of said radiation induced light wavelength shifters received in said through holes; and a plurality of light transmission fibers each connected separately to an end of said fluorescent optical fiber through an optical connector so that light generated in each fluorescent optical fiber is transmitted through each optical transmission fiber.

With this construction, a two dimensional pattern of radiation doses can be detected quickly. Also, since a bundle of fluorescent optical fibers whose light receiving window is larger than the light emitting window of the cylindrical scintillator can be connected, almost all light emitted by the scintillator undergoes the wavelength shifting process with efficiency. In addition, because a bundle of optical transmission fibers with a light receiving surface which is larger than the end surface of the fluorescent optical fibers can be connected, almost all the light whose wavelengths have been shifted by the fluorescent optical fibers can be efficiently transmitted. Thus, without losing information on radiation energy, the radiation detection signals can be transmitted.

Furthermore, radiation detection signals from each radiation induced light wavelength shifter can be transmitted as separate signals. In addition, information such as two-dimensional radiation dose distribution can be transmitted to a remote place without a power supply.

DETAILED DESCRIPTION OF THE PREFERRED EMBODIMENT

With reference to the accompanying drawings, an embodiment of the present invention will be described.

Figure 1:
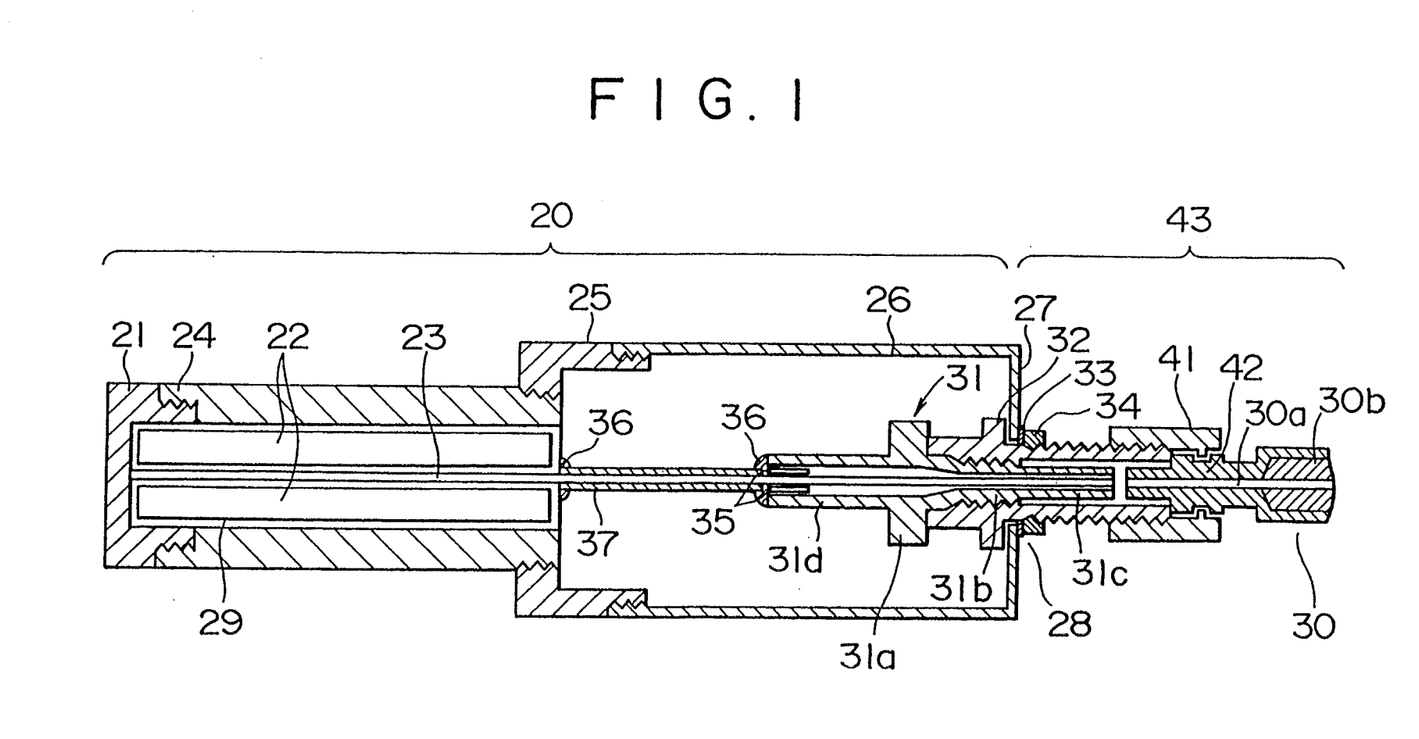
FIG. 1 is a cross-sectional view showing the construction of a radiation induced light wavelength converter according to an embodiment of the present invention.

FIG. 1 is a cross-sectional view showing the structure of a radiation induced light wavelength shifter 20. The radiation induced light wavelength shifter 20 comprises an end plug portion 21, a cylindrical scintillator 22, a fluorescent optical fiber 23, a scintillator housing 24, a joint 25, an optical connector housing 26, a rear panel 27, and an optical connector 28. The cylindrical scintillator 22 is contained in a casing whose outer periphery is coated with a reflecting material made from fluororesin or the like. The fluorescent optical fiber 23 is, at one end, coaxially disposed in the scintillator 22. The scintillator housing 24 covers the outer periphery of the scintillator 22 and is provided with the end plug portion 21 at an end thereof.

In the figure, the scintillator 22 is constructed of a pair of semi-cylinders made of thallium (Tl) doped sodium iodide (NaI) or the like. Each of the semi-cylinders has, at and along an axial center of a circle defined thereby, a semi-cylindrical groove with a radius of approximately 0.5 mm and is covered with a transparent member 29 which is quartz glass etc. The pair of semi-cylinders form, in combination, a full cylindrical structure which defines a hole with a diameter of approximately 1 mm along a central axis. The fluorescent optical fiber 23 is inserted and disposed in and through the axial hole.

The kinds of the scintillator 22 usable in this invention include an inorganic scintillator, an organic scintillator, and a liquid scintillator, etc. With respect of the property of scintillator 22, the only requirement is that the spectrum of wavelengths of light which can excite the scintillator 22 should coincide with the spectrum of wavelengths of light excited by the fluorescent optical fiber 23. Thus, various combinations may be available depending on the type of radiation to be detected and the characteristics of light emitted or produced by the scintillator to be used.

In addition, since the light wavelength shifter 20 is connected to an optical transmission fiber 30 as a transmission path via the optical connector 28, an optical combination of the scintillator 22 and the fluorescent optical fiber 23 is made to provide a wavelength band with less transmission loss in the optical transmission fiber 30.

The optical connector 28 before-mentioned comprises a guide tube 31 and an outer sleeve 32. The guide tube 31 is integrally constructed of a flange 31a, a cylinder 31d, and another cylinder 31b. The flange 31a is positioned at the exterior of the guide tube 31. The cylinder 31d is positioned on the side of the flange 31a near the scintillator 22 and has a hole of a diameter of approximately 2 mm. The cylinder 31b is positioned between the optical transmission fiber 30 and the flange 31a, and has a hole which gradually narrows toward the optical transmission fiber 30 from approximately 2 mm to 1 mm. In addition, the cylinder 31b has threaded outer surface and a fiber sleeve 31c of relatively smaller diameter.

The outer sleeve 32 is of cylindrical shape so as to be screwed onto the cylinder 31b of the guide tube 31 and has thread formed in the outer periphery thereof. By engaging a put 34 on the thread with a washer 33, the guide tube 31 and the outer sleeve 32 can be fixed to the rear panel 27.

As described herein before, the fluorescent optical fiber 23 is disposed in the scintillator 22 with one end coated with the reflecting material. The other end of the fluorescent optical fiber 23 is inserted into the guide tube 31 through the hole of the cylinder 31d. In addition, the fluorescent optical fiber 23 in the guide tube 31 is fixed by a cushion member 35 which is made of rubber or the like is inserted into a clearance at the mouth of the hole in the cylinder 31d.

The mouth or opening of the optical insulating tube 37 described later, the cushioning member 35 and the cylinder 31d of the guide tube 31 are optically insulated by optical insulating substance 36 which are made of silicone rubber or the like.

The other end surface of the fluorescent optical fiber 23 is located at an appropriate point protruding slightly more than the end of the fiber sleeve 31c of the guide tube 31 comprising the optical connector 28, and abraded after heat treatment so as to decrease the emission angle of the light. The guide tube 31 and the outer sleeve 32 are designed to be connected by a screw engagement as a combined structure in which the center of the optical axis at the other end surface of the fluorescent optical fiber 23 is nearly aligned with the center of the outer sleeve 32.

In addition, the scintillator 22 contained in the transparent layer 29 which is made of quartz is designed to form a cylindrical structure defining, at its axial center, a hole with a diameter of approximately 1 mm when the pairs of the semi-cylinders are put together as described above. The fluorescent optical fiber 23 is inserted, at one end, in the axially central hole of the scintillator 22 and is covered by the optical insulating tube 37 over the outer periphery between the guide tube 31 of the optical connector 28 and the mouth of the hole of the scintillator 22.

A light-reflecting material made, for example, of magnesia (MgO) is coated on and over the outer peripheral surface of the scintillator 22 encased in the transparent case 29. Alternatively, a rubber strip which reflects and insulates light may be wound around the scintillator 22. The light-reflecting material mentioned above is also attached to opposite ends of the transparent case 29 so as to reflect the light emitted by the scintillator 22 and prevent the light from leaking out.

In the conventional apparatus shown in FIG. 14, an optical paste which is made of silicone grease or the like is applied to optical connecting portions so as to prevent light from scattering and improve linear transparency. In the present invention, it is rather preferable that light emitted by the scintillator 22 enters the fluorescent optical fiber 23 through the whole clad surface, as much as possible, at right or inclined incident angle. Accordingly, unlike the conventional apparatus, an optical paste is not applied to the gap between the scintillator 22 and the fluorescent optical fiber 23, so as to help the reflected or scattered light from the scintillator 22 to enter the fluorescent optical fiber 23 at various angles.

Referring-to the drawing, the casing of the radiation induced light wavelength shifter 20 comprises the end plug 21, the scintillator housing 24, the joint 25, the optical connector housing 26, the rear panel 27, the washer 33, and the nut 34, each of which may be made of aluminum or the like.

The end plug 21 is a cap which optically insulates and hermetically closes one end of the scintillator housing 24. The end plug 21 has a thread on its inner surface and may be connected to the scintillator housing 24 in a thread engagement.

As illustrated in the drawing, the scintillator housing 24 is in a cylindrical shape, and has the end plug 21 at an end and, at the other end, thread to be screwed into the joint 25. The joint 25 is to used for connecting the scintillator housing 24 and the optical connector housing 26 and is made of aluminum. Further, the joint 25 is a cylindrical structure which has, on an inner and outer surface, threads to be used to connect the scintillator housing 24 and the optical connector housing 26, respectively.

The optical connector housing 26 houses the fluorescent optical fiber 23 between the scintillator 22 and the optical connector 28. The optical connector housing 26 is associated with the rear panel 27 so as to form a cylindrical body with a closed bottom. The optical connector housing 26 also has, at an end apart from the rear panel 27, a thread which, in turn, is engaged with the joint 25.

The portion where the transparent case 29 meets the optical insulating tube 37 on the fluorescent optical fiber 23 through the light-reflecting material is fixed with epoxy resin or the like. As shown in the figure, the optical insulating material 36 is deposited over this portion. When the fluorescent optical fiber 23 is arranged as shown in the figure, a part of the thread on the outer surface of the outer sleeve 32 projects from the hole of the rear panel 27 of the optical connector housing 26.

The optical connector 28 shown in the drawing comprises the guide tube 31 and the outer tube 32. The optical transmission fiber 30, which functions as an optical transmission path, is connected to the optical connector 28 described above through a receiving optical connector section 43 which, in turn, comprises a receiving optical connector 41 and a fiber sleeve 42.

Some of commercially available optical connectors may be used as the optical connector 28 and the receiving connector portion 43. Such optical connectors are widely used for connecting optical transmission fibers and can be easily attached and detached. With these optical connectors, optical fibers with an equal diameter can be very easily connected.

The material for the optical transmission fiber 30 is generally composed of an optical fiber 30a and an outer sheath 30b. The optical transmission fiber 30 is made up from the material so as to connect the receiving optical connector 41 and the fiber sleeve 42 by peeling an end of the outer sheath 30b and baring the optical fiber 30 therein. Thereafter the bared end of the optical fiber 30a is inserted into the fiber sleeve 42 until the outer sheath 30b is inserted into and stopped by the fiber sleeve 42. Thus, the end surface of the optical transmission fiber 30a is located out of the fiber sleeve 42. Under such condition, the end of the optical fiber 30a is cut in the vicinity of the connecting end of the optical transmission fiber 30, and then a cut surface is heat treated and abraded so as to make smaller the angle of light emission from the optical transmission fiber. Finally the fiber sleeve 42 in which the outer sheath 30b is inserted lightly compressedly deformed around its center so that the optical fiber 30a is fixed.

Though not shown in the drawing, the other end of the optical transmission fiber 30 bears the same treatment so that it is connected to an adapter (not shown), The connection of the optical connector 28 and the receiving connector portion 43 is made by fixing the receiving optical connector 41 to the outer sleeve 32 of the optical connector 28 by thread means in a thread engagement. At this point, the end surface of the fluorescent optical fiber 23 which slightly protrudes from the fiber sleeve 31c of the guide tube 31 should be faced, as close as possible, to the end surface of the optical fiber 30a in the fiber sleeve 42 in the receiving connector 43 in such a way that the optical axis of the fluorescent optical fiber 23 may align with that of the optical transmission fiber 30 without contact therebetween.

Thus, the power of emitted light by the fluorescent optical fiber 23 efficiently enters into the optical transmission fiber 30. It is desirable that the diameter of the fluorescent optical fiber 23 is the same as that of the optical transmission fiber 30. When, however, the numerical aperture and the angle of light emission of the fluorescent optical fiber 23 and the optical transmission fiber 30 are different from each other, it is necessary that the diameter of the optical transmission fiber 30 should be designed to be larger than that of the fluorescent optical fiber 23.

As described above, the radiation induced light wavelength shifter 20 has an aluminum casing, as the outermost member, housing almost all the members thereof and is optically insulated by sealing. In addition, as the optical insulating tube 37, the optical insulating material 36, and so forth insulates external light, noise generated in the scintillator 22 and the fluorescent optical fiber 23 can be great by reduced.

Furthermore, in the radiation induced light wavelength shifter 20, the scintillators 22 are formed in a cylindrical structure so that light generated around the axial center of the scintillator 22 is reflected at the reflecting member disposed on the periphery, repeatedly scattered and concentrated into the axial center region in the scintillator 22. Accordingly, the radiation induced light wavelength shifter 23 can collect light generated at the fluorescent optical fiber 23 with less losses.

In the structure before mentioned, when radiation enters and excites the scintillator 22 to emit light, the light emitted enters through the clad surface of the fluorescent optical fiber 23 toward the core thereof. The wavelength of the incident light is efficiently shifted to a longer wavelength band according to light excitement and wavelength shifting function of the fluorescent optical fiber 23. Then the light is collected by the fluorescent optical fiber 23 and transmitted to the output terminal to which the optical connector 28 is optically connected.

Moreover, the output light of the fluorescent optical fiber 23 enters the optical transmission fiber 30 by the optical connector 28 with less loss. Thus, optical signals can be sent to an optical power meter or a photomultiplier tube (not shown) disposed at the other end of the optical transmission fiber 30 without using a power supply.

Next, with reference to FIG. 2, the details of connecting structure between the optical transmission fiber 30 and the optical power meter in a counting section or a sensor section of the photomultiplier tube connected to the other end of the optical transmission fiber 30 will be described. The sensor in the counting section may be a commercially available photomultiplier tube which counts the number of electric pulses which is proportional to the quantity of the light received. Alternatively, the sensor may be an optical power meter measuring the quantity of the light by means of photosemiconductor.

Figure 2:
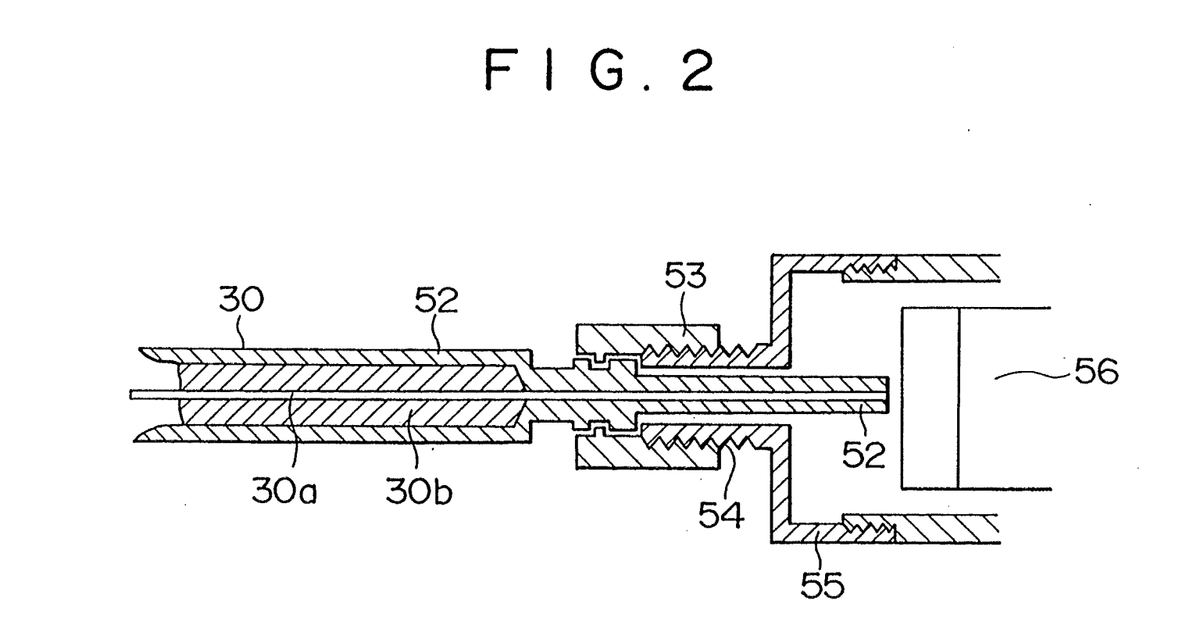
FIG. 2 is a cross-sectional view showing connections on an adapter side according to the embodiment.

In such cases, some improvements shown in FIG. 2 are needed to connect the output end of the optical transmission fiber 30 and an optical sensor (for example, in the photomultiplier tube or optical power meter). Describing structurally, the output end of the optical transmission fiber 30 is composed of a fiber sleeve 52 and a receiving optical connector 53. The structure of the output end of the optical transmission fiber 30 is the same as that of the input end thereof connected to the optical connector 28 of the radiation induced light wavelength shifter 20.

An adapter 55 connected to the fiber sleeve 52 and the receiving connector 53 is of cylindrical shape with an end plate which, in turn, is provided with a cylindrical connection tube 54 integrally formed in axial alignment relationship. The connection tube 54 has a thread formed on the outer surface so as to be connected to the receiving optical connector 53.

When the receiving optical connector 53 is screwed and fastened to the connection tube 54, the fiber sleeve 52 protrudes from the inner end of the connection tube 54 toward the open end of the adapter 55. Thus, the end surface of the fiber sleeve 52 is positioned as close as possible to the input window of the sensor section 56 and faces the input window without contact.

Next, a measuring operation with the apparatus described before will be described.

Figure 3:
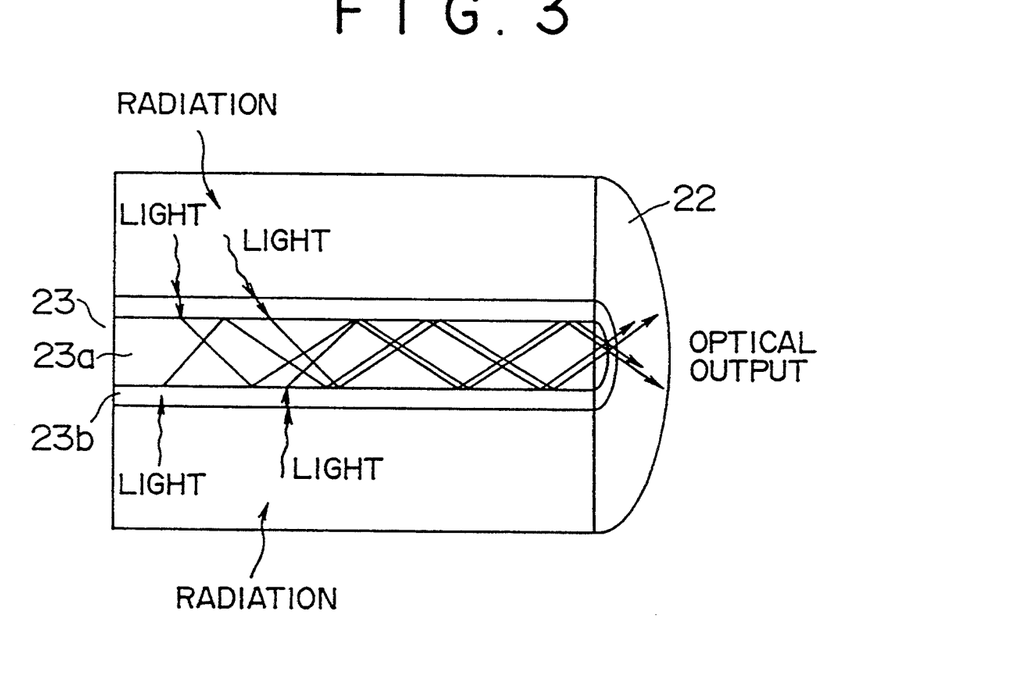
FIG. 3 is a schematic diagram showing a process for detecting radiation by a scintillator and a fluorescent optical fiber according to the embodiment.

FIG. 3 is a schematic diagram for explaining how radiation is detected. When the scintillator 22 is exposed to radiation, it emits fluorescent light. The fluorescent light enters the periphery of the fluorescent optical fiber 23, namely, the clad 23b at a right or other angle and thereafter excites the fluorescent substance in the core 23a. The emitted light is collected and transmitted to the fiber end where the light is output.

Thus, the light is output from the fluorescent optical fiber 23 with wavelengths which are more suitable for transmission after being shifted from those of the input light. As a result, the output density has been relatively increased.

Figure 4:
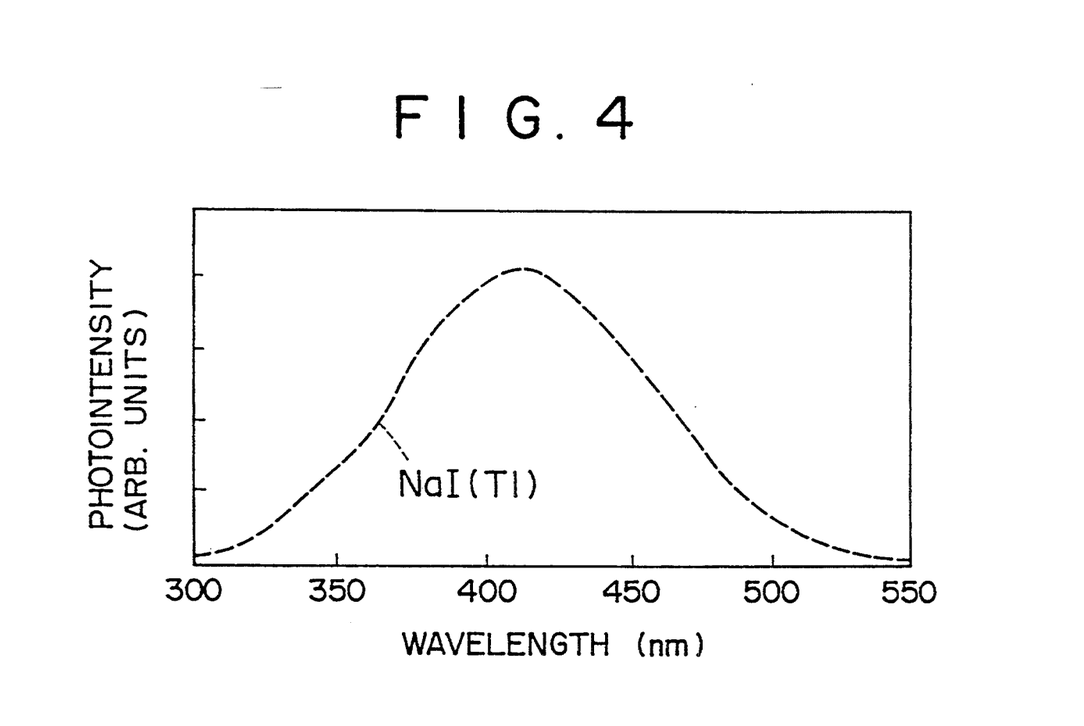
FIG. 4 is a graph showing the spectrum of wavelengths of light emitted by the scintillator according to the embodiment.

FIG. 4 shows an example of emission spectrum of the scintillator as a function of wavelength. When gamma rays enter the scintillator 22 made of thallium (Tl) doped sodium iodide (NaI) which has the spectrum shown in the figure, the scintillator 22 emits light with a peak in photointensity at a wavelength of 410 nm. In FIG. 4, the thallium doped sodium iodide is designated as NaI(Tl).

Figure 5:
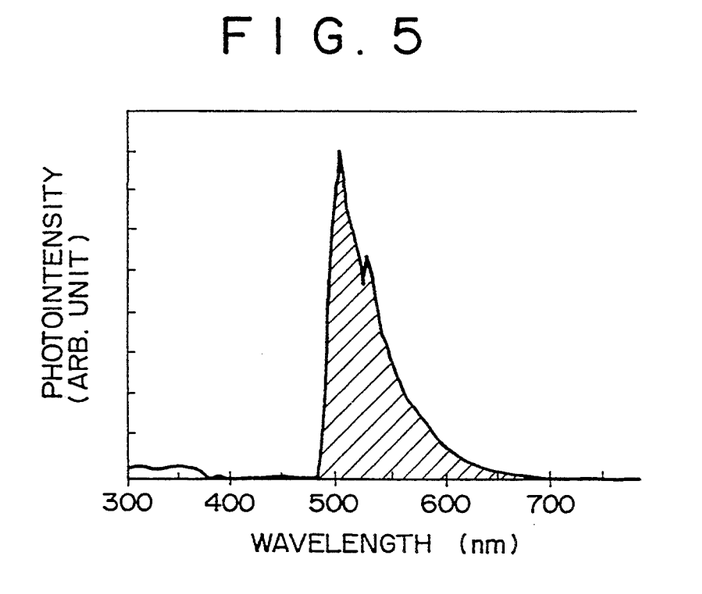
FIG. 5 is a graph showing the spectrum of wavelengths of light emitted by the fluorescent optical fiber according to the embodiment.

FIG. 5 shows an example of emission spectrum of the fluorescent optical fiber 23 as a function of wavelength. As seen from the figure, the fluorescent optical fiber 23 emits light with a peak in photointensity at a wavelength of about 500 nm.

Figure 6:
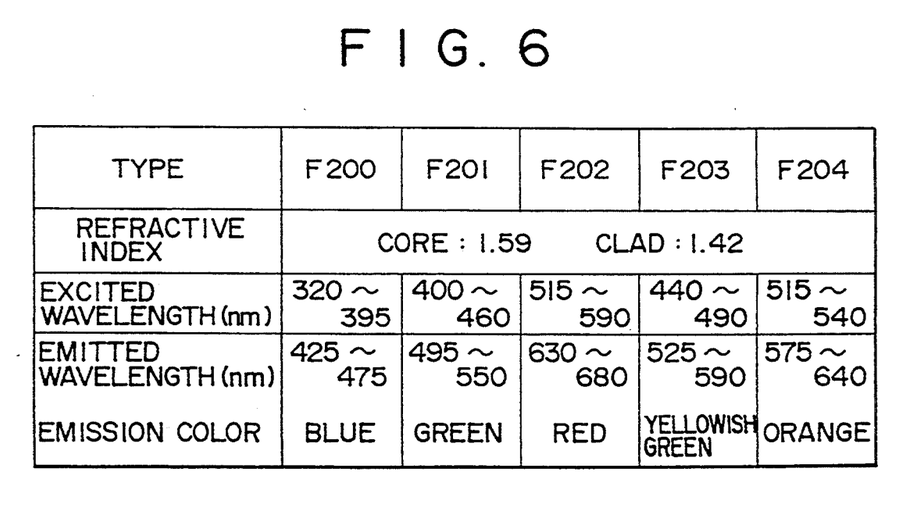
FIG. 6 is a table giving spectrum characteristics of light absorbed and emitted by the fluorescent optical fibers according to the embodiment.

FIG. 6 is a table in which the relation between a wavelength band of exciting light and that of emitted light for the fluorescent optical fiber 23 are shown. Since the scintillator 22 shown in FIG. 4 emits light in wavelength band from 300 nm to 550 nm with a peak at a wavelength of 410 nm, it is found that a fluorescent optical fiber designated as product number F201 with exciting light in a wavelength band from 400 nm to 460 nm is suitable as that to be used with the scintillator 22. The fluorescent optical fiber F201 emits light in wavelengths ranging from 495 nm to 550 nm with a peak at a wavelength of approximately 520 nm. The light emitted from the fluorescent optical fiber 23 is in green color and has been shifted to a longer wavelength band by the fluorescent optical fiber 23. It should be noted that there are different types of scintillator which emit light in different wavelengths and a fluorescent optical fiber may be selected so as to match with the emitted light wavelengths of the scintillator used.

Figure 7A:
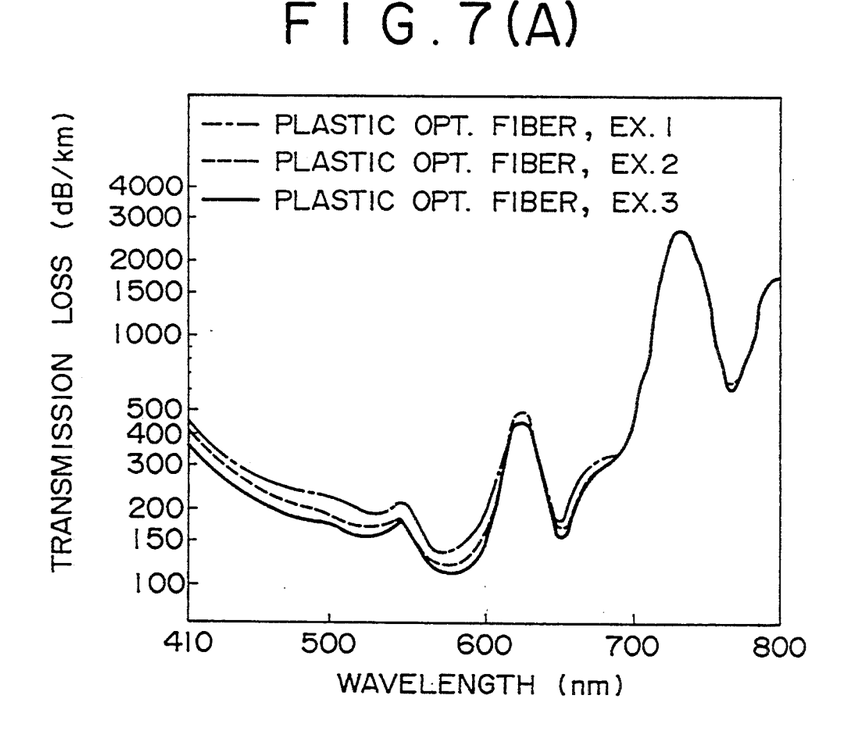
FIG. 7(a) and FIG. 7(b) are graphs giving relation between wavelengths and transmission loss for plastic optical transmission fibers and a quartz optical transmission fiber according to the embodiment, respectively.

FIG. 7(a) is a graph giving the relation between transmissible wavelengths and their transmission losses in plastic optical transmission fibers. In the vicinity of wavelength of 410 nm, the transmission loss of the fluorescent optical fiber 23 is as high as approximately 400 dB/km. On the other hand, in the vicinity of wavelength of 520 nm, the transmission loss of the fluorescent optical fiber 23 is approximately 150 dB/km. Thus, it is clear that signals can be transmitted in a wavelength band with a low transmission loss according to the present invention.

Thus, it has been found that the wavelengths of light emitted by the fluorescent optical fiber 23 are more suitable for transmitting signals than those of light emitted by the scintillator 22 which represent radiation intensity detecting signals.

Figure 7B:
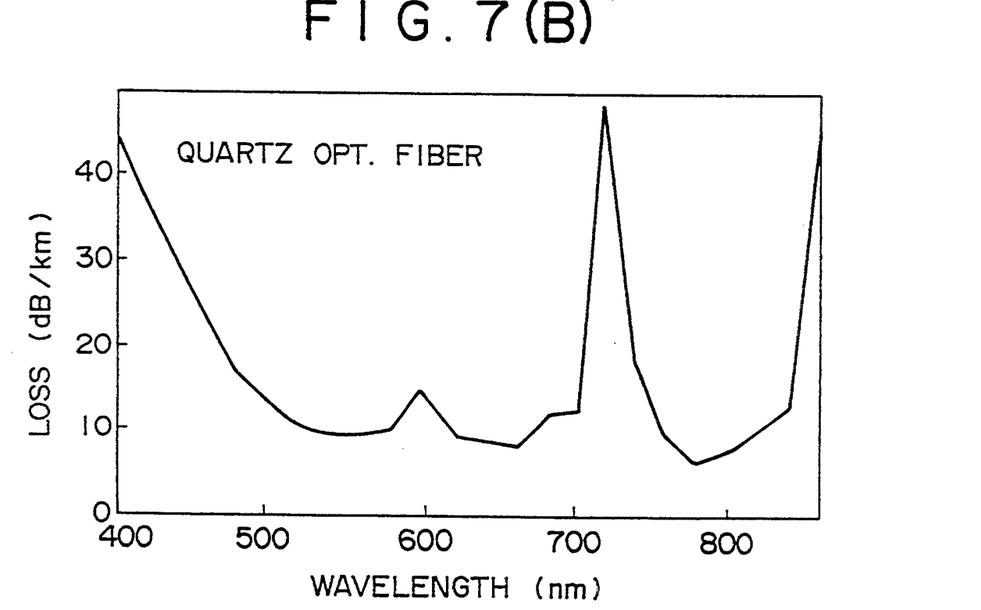

FIG. 7(b) is a graph showing the relation between wavelengths of light transmitted and its optical transmission loss in an optical fiber substantially made of quartz. In the vicinity of wavelength of 520 nm of the light emitted by the fluorescent optical fiber 23, the transmission loss is as low as approximately 10 dB/km. The graph shows that the quartz optical fiber can transmit the light emitted by the fluorescent optical fiber 23 in a wavelength band with lesser transmission loss. Accordingly, it is to be appreciated that the quartz optical fiber is suitable for signal transmission over long distances compared to the plastic optical transmission fibers.

With the use of the optical transmission fiber 30 as a signal transmission path, transmitted signals are not affected by electric noise unlike in electrical signal cables. In addition, since the radiation induced light wavelength shifter 20 outputs light itself, a power supply for amplification and signal transmission can be advantageously omitted.

The radiation induced light wavelength shifter 20 provided with the optical connector can be very easily manufactured. In addition, it is advantageous that the radiation induced light wavelength shifter 20 can be easily attached to and detached from the optical transmission fiber 30 and can do signal transmission without amplifying electric noise.

Accordingly, by temporarily detaching the optical transmission fiber 30 from the radiation induced light wavelength shifter 20, passing the fiber 30 through a narrow place or a narrow hole in a wall, and attaching again the fiber 30 to the radiation induced light wavelength shifter 20, the counting section which tends to be affected by environmental noise (such as electric noise) can be spaced far apart from objects to be detected.

With such an arrangement, radiation measurements which have been difficult with conventional apparatuses under electromagnetic environment or in water can be carried out with ease.

As described above, since the transmission loss in the fluorescent optical fiber 23 is large and hence not suitable for optical transmission, the optical transmission fiber 30 is alternatively used by being connected to the fluorescent optical fiber 23 through the above-mentioned optical connector. For signal transmission for short distances, an inexpensive plastic optical transmission fiber may be selected, while for signal transmission for a long distance, a quartz optical transmission fiber may be preferred in spite of expansiveness.

Figure 8:
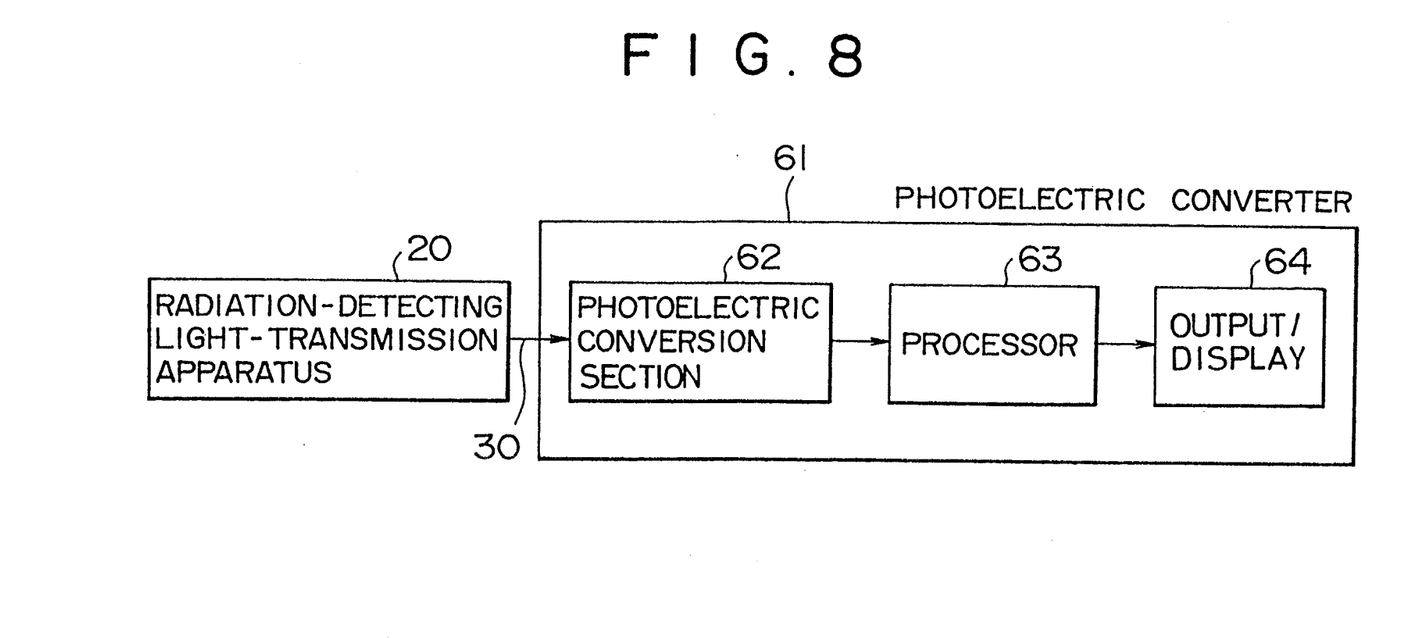
FIG. 8 is a block diagram showing the construction of a measurement setup to which the radiation induced light wavelength converter according to the present invention is connected.

FIG. 8 is a block diagram showing the general scheme of a photoelectric conversion processing section 61 as a measuring and testing unit connected to the optical transmission fiber 30. The photoelectric conversion processing section 61 comprises a photoelectric converting section 62, a processing section 63, and an indicating section 64. In the section 61, the photoelectric converting section 62 converts optical signals received from the optical transmission fiber 30 into electric signals, and the processing section 63 determines the value of the electric power in the electric signal obtained in the photoelectric converting section 62 by signal processing and converts the value of the electric power into that in digital form. The indicating section 64 outputs and indicates the value of the electric intensity gained in the processing section 63.

Figure 9:
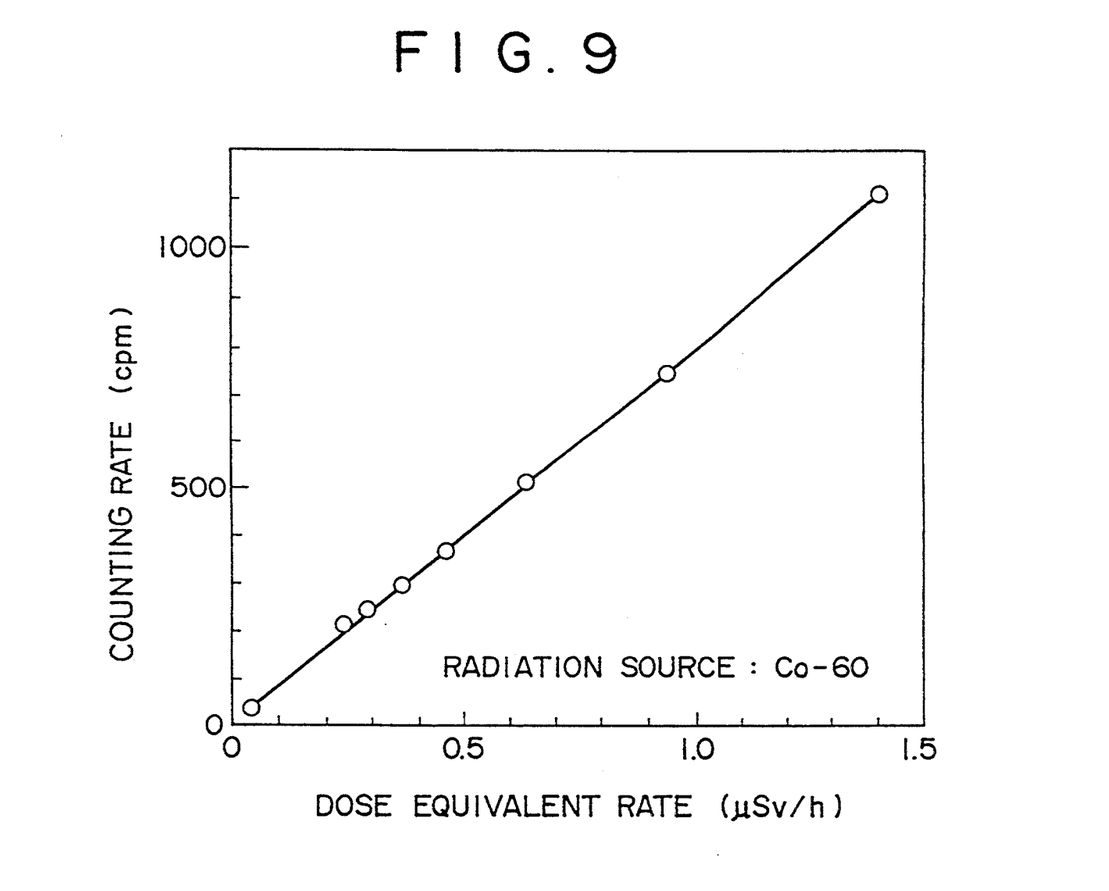
FIG. 9 is a graph giving a measurement test result of a radiation source according to an experimental example.

FIG. 9 is a graph showing test results obtained with the detecting and testing unit shown in FIGS. 1 and 8. The length and outer diameter of the cylindrical scintillator 22 of the radiation induced light wavelength shifter 20 used was 20 cm and 0.8 cm, respectively, The diameter of the fluorescent optical fiber 23 was 1 mm. The length of the optical transmission fiber 30 was 10 m. In this test, cobalt 60 ($^{60}Co$) which radiates gamma rays was used, The horizontal axis of the graph gives dose equivalent rates, whereas the vertical axis thereof gives counting rates (counts/minute). As illustrated in the graph, increases in the dose-equivalent rate are proportional to increases in the counts by the detecting unit. Accordingly, the illustration shows that the radiation induced light wavelength shifter 20 according to this invention can be used as a radiation counter.

Next, with reference to FIGS. 10 and 11, radiation measurements and their results carried out by using the apparatus according to the present invention in the vicinity of a top portion of a nuclear fuel assembly laid in a water pool of a nuclear power plant will be described hereinafter.

In this test, the length of the cylindrical scintillator 22 used was 2 cm, the outer diameter thereof being 0.8 cm, the diameter of the fluorescent optical fiber 23 used being 1 mm. Waste nuclear fuel emitted strong radiation in the water pool 70.

In this test, the radiation induced light wavelength shifter (hereinafter referred to as "detector") 20 was fixed in an upper portion of a through hole defined at a center of a cylindrical lead collimator 75 received in a cylindrical vessel 71. The optical transmission fiber 30 was extended to the outside of the cylindrical vessel 71 and connected to a counter section (not shown). In the counter section the number of electric pulses received is counted by a photoelectron multiplying tube.

The lead collimator 75 is a conventional member generally used to improve the directivity of the detector 20 and to distinguish a radiation source to be measured from the others. In this test, to distinguish the nuclear fuel element assembly to be measured in the water pool 70 from the others, the lead collimator 75 was placed to improve the downward directivity of the detector 20.

The cylindrical vessel 71 which contains the detector 20 was hung and lowered from the water level of the water pool 70 to a position near the top of the fuel assembly in the water by a rope.

Figure 10A:
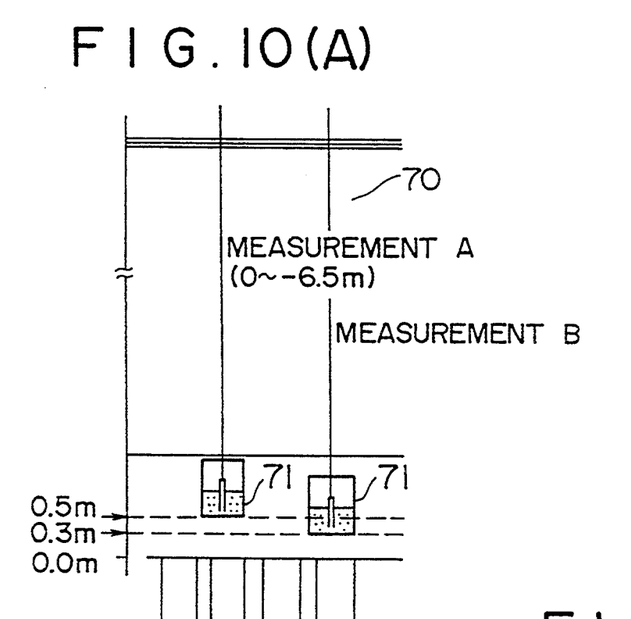
FIG. 10(a) is a schematic diagram showing the way measurements over nuclear fuel element assembly disposed in water were carried out according to an experimental example.

FIG. 10(a) shows a situation in which the cylindrical vessel 71 containing the detector 20 is hung in the water pool 70. For the measurements, the cylindrical vessel 71 was positioned at the location in positions 50 cm and 30 cm apart from the top of the nuclear fuel assembly placed in the water pool 70. At these positions, radiation was measured.

Figure 10B:
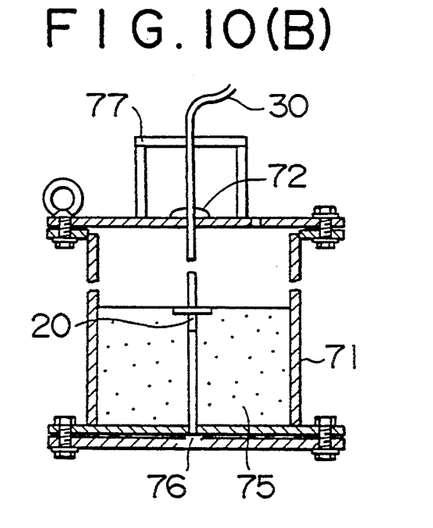
FIG. 10(b) is a schematic diagram showing the collimator according to one embodiment for the measurements shown in FIG. 10(a)

FIG. 10(b) is a cross-sectional view showing the cylindrical vessel 71 which contains the detector 20 and the lead collimator 75, the detector 20 being received in a center hole of the lead collimator 75.

Figure 10C:
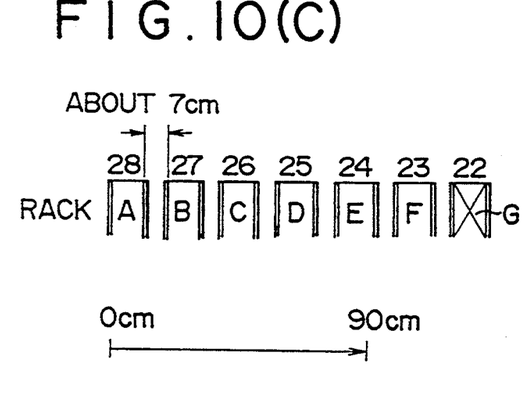
FIG. 10(c) is a schematic diagram showing an arrangement of separate lacks holding nuclear fuel assemblies.

FIG. 10(c) is showing an arrangement of the nuclear fuel assemblies each placed in the water pool 70. In an actual water pool, the nuclear fuel assemblies are normally held in individual storage racks, one by one. FIG. 10(c) shows individual racks each designated by symbol A to F. In this case, the nuclear fuel assemblies are separately contained in the racks B, C, D, and F, while an activated substance other than nuclear fuel assemblies is contained in the rack G. In the drawing, the racks A, E are empty.

Figure 11A:
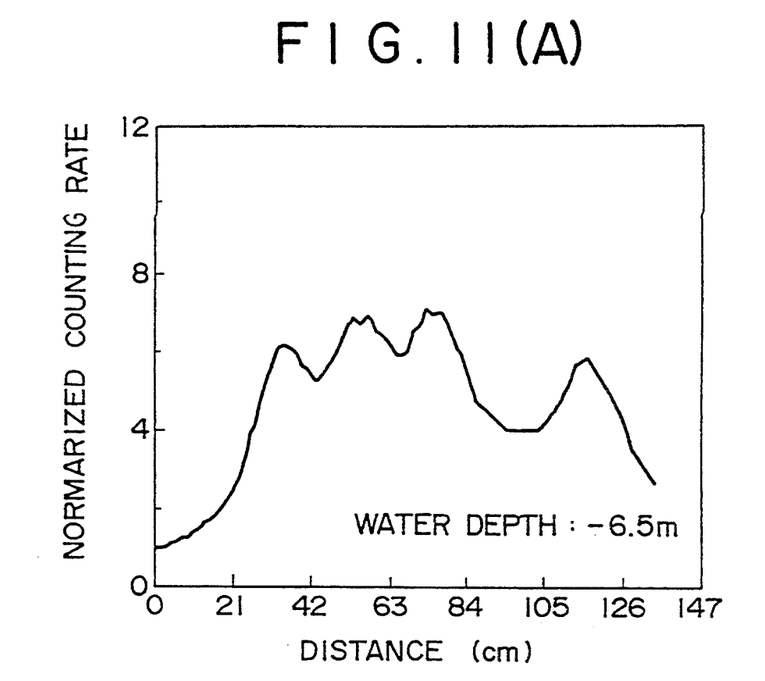
FIG. 11(a) is a graph showing measurement results obtained as described in FIGS. 10(a)–(c)
Figure 11B:
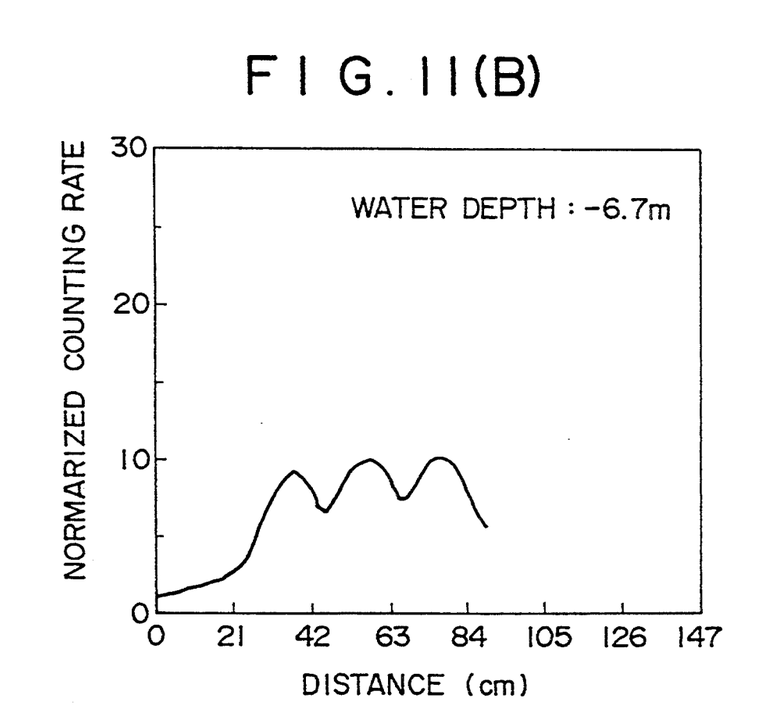
FIG. 11(b) is another graph showing measurement results obtained as described in FIGS. 10(a)-(c) with somewhat different conditions.

FIG. 11 shows graphs giving test results by the detector 20 contained in the cylindrical vessel 71 which travelled in a horizontal direction at predetermined time intervals. In these graphs, the horizontal axis indicates horizontal distances, whereas the vertical axis shows normalized values of the count rate (normalized counts per unit time), FIG. 11(a) shows measurement results obtained at positions 50 cm vertically apart from the top of the nuclear fuel assembly, namely, at 6.5 m from a water level. A lead plug was used. On the other hand, FIG. 11(b) shows measurement results obtained at positions 30 cm vertically apart from the top portion of the nuclear fuel element assembly, namely, at 6.7 m from a water level. A lead plug was also used.

These measurement results represent peak values just above the nuclear fuel assembly. The more the detector 20 approaches to the nuclear fuel assembly, the more the peak value in the count rate increases. Thus, it was shown that the detector 20 can accurately measure radiation from the nuclear fuel assembly. It should be noted that the vertical scale in FIG. 11(a) is different than that in FIG. 11(b). This is because the measurement positions in FIG. 11(b) are closer to the nuclear fuel assembly than those in FIG. 11(a).

From the experimental results before described, it should be appreciated that the radiation induced light wavelength shifter 20 according to the present invention successfully works as a practical radiation measuring system. In addition, while the radiation induced light wavelength shifter 20 is very light and compact, it can measure radiation without any influence from environmental conditions (for example, the existence of water or electromagnetic field).

Although the above-described radiation induced light wavelength shifter 20 has only one scintillator 22 as a detector, the size of the scintillator 22 may be made smaller and then a plurality of such scintillators can be used in an arrayed arrangement.

In this case, the scintillator 22 may be a plastic scintillator tube with an inner diameter of 1 mm and an outer diameter of 2 mm instead of the thallium doped sodium iodide (NaI:Tl) as described above. A light-reflecting material is disposed on the outer periphery of the plastic scintillator tube.

Figure 12:
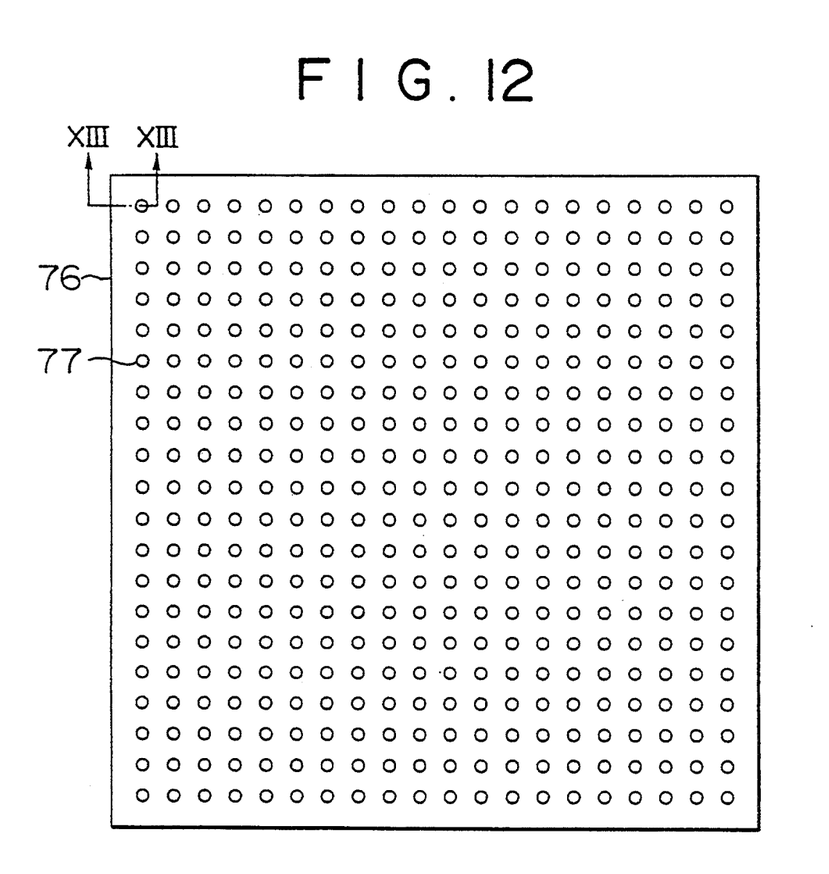
FIG. 12 is a horizontal cross sectional view of a collimator according to an embodiment of the present invention, showing an arrangement of through holes for holding wavelength shifters.
Figure 13:
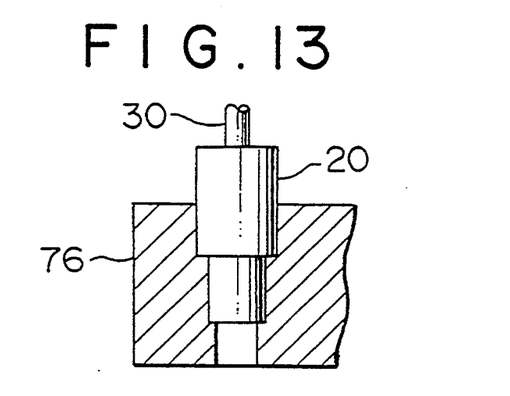
FIG. 13 is a vertical cross sectional view along the plane represented by line XIII—XIII in FIG. 12, showing also a part of the wavelength shifter placed in the through hole.

Thus, as schematically shown in FIGS. 12 and 13, provided is a radiation-detecting light-transmission apparatus comprising: a rectangular collimator 76 having 20×20 through holes 77 arranged in a matrix pattern; 20×20 radiation induced light wavelength shifters 20 disposed in the 20×20 through holes, each wavelength shifter comprising a columnar scintillator having a light-reflecting material disposed on an outer peripheral surface thereof, the scintillator being adapted to emit light by incident radiation, a fluorescent optical fiber whose one end axially extends to the scintillator, the fluorescent optical fiber being adapted to emit light by the light received from the scintillator, and an optical connector connected to the other end of the fluorescent optical fiber; an optical shielding casing for entirely covering the 20×20 radiation induced light wavelength shifters; and 20×20 optical transmission fibers 30 connected to said other end of each of the fluorescent optical fibers through the 20×20 optical connectors, the 20×20 optical transmission fibers being adapted to transmit received light to an outside of said apparatus.

The radiation detection signals of the radiation induced light wavelength shifters can be transmitted as discrete signals. In addition, information such as two-dimensional distribution of radiation dose can be transmitted to a remote place without necessity of a power supply.

We claim:

1. A radiation induced light wavelength shifter comprising:

a columnar scintillator;

a fluorescent optical fiber which is substantially coaxially inserted into the scintillator, said fluorescent optical fiber extending out of the scintillator;

a light shielding member covering said scintillator and said fluorescent optical fiber, and a light reflecting material surrounding said scintillator within said light shielding member.

2. A radiation-detecting light-transmission apparatus comprising:

a columnar scintillator;

a fluorescent optical fiber which is substantially coaxially inserted into the scintillator, said fluorescent optical fiber extending out of the scintillator;

a light shielding member covering said scintillator and said fluorescent optical fiber;

a light reflecting material surrounding said scintillator arranged in said light shielding member; and an optical transmission fiber which is connected to an end of said fluorescent optical fiber through an optical connector, said optical transmission fiber transmitting light generated in said fluorescent optical fiber.

3. A radiation-detecting light-transmission apparatus comprising:

a columnar scintillator;

a transparent optical member surrounding said scintillator;

a fluorescent optical fiber an end of which is inserted substantially coaxially into said scintillator and which emits light upon receiving light from the scintillator;

an optical connector connected to the other end of the fluorescent optical fiber;

a light reflecting material covering an outer circumferential and end surfaces of said transparent optical member;

a light shielding casing covering said light reflecting material said scintillator and said fluorescent optical fiber; and an optical transmission fiber which is connected to the other end of said fluorescent optical fiber through said optical connector.

4. A radiation-detecting light-transmission apparatus comprising:

a plurality of radiation induced light wavelength shifters, each radiation induced light wavelength shifter comprising a columnar scintillator; a transparent optical member surrounding said scintillator; a fluorescent optical fiber which is inserted substantially coaxially into said scintillator and emits light upon receiving light from the scintillator; an optical connector connected to an end of the fluorescent optical fiber; a light reflecting material covering an outer circumferential and end surfaces of said transparent optical member; and a light shielding casing covering said light reflecting material said scintillator and said fluorescent optical fiber;

a collimator having a plurality of substantially parallel through holes for holding said radiation induced light wavelength shifters; and a plurality of light transmission fibers each connected separately to an end of one of the plurality of fluorescent optical fibers through an optical connector so that light generated in each fluorescent optical fiber is transmitted through a respective optical transmission fiber.

5. The radiation-detecting light-transmission apparatus according to claim 4, wherein said through holes are distributed in an m×n matrix pattern, where m and n are natural numbers.

* * * * *